United States Patent
Ohara et al.

(10) Patent No.: US 10,616,445 B2
(45) Date of Patent: Apr. 7, 2020

(54) INFORMATION PROCESSING APPARATUS, IMAGE FORMING APPARATUS, INFORMATION PROCESSING METHOD, AND NON-TRANSITORY COMPUTER READABLE MEDIUM FOR MANAGING SETTING ITEMS

(71) Applicant: FUJI XEROX CO., LTD., Tokyo (JP)

(72) Inventors: Kota Ohara, Kanagawa (JP); Toshihide Omori, Kanagawa (JP); Kenji Ebitani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/447,669

(22) Filed: Mar. 2, 2017

(65) Prior Publication Data
US 2018/0063376 A1    Mar. 1, 2018

(30) Foreign Application Priority Data
Aug. 24, 2016    (JP) ................................ 2016-163272

(51) Int. Cl.
*G06F 3/12*    (2006.01)
*H04N 1/44*    (2006.01)
(Continued)

(52) U.S. Cl.
CPC ......... *H04N 1/4433* (2013.01); *H04N 1/0097* (2013.01); *H04N 1/00474* (2013.01); *H04N 1/00482* (2013.01); *H04N 1/00517* (2013.01); *H04N 1/33369* (2013.01); *H04N 2201/0094* (2013.01)

(58) Field of Classification Search
None
See application file for complete search history.

(56) References Cited

U.S. PATENT DOCUMENTS

| 2008/0022212 A1* | 1/2008 | Kodimer | G06F 9/451 |
|---|---|---|---|
| | | | 715/744 |
| 2011/0214167 A1* | 9/2011 | Oka | G06F 21/608 |
| | | | 726/7 |

(Continued)

FOREIGN PATENT DOCUMENTS

| JP | 2008-047106 A | 2/2008 |
|---|---|---|
| JP | 2009-177828 A | 8/2009 |

(Continued)

OTHER PUBLICATIONS

Feb. 14, 2020 Office Action issued in Japanese Patent Application No. 2016-163272.

*Primary Examiner* — Henok Shiferaw
(74) *Attorney, Agent, or Firm* — Oliff PLC (57) ABSTRACT

An information processing apparatus includes an authenticating unit, a detection unit, and a controller. The authenticating unit authenticates an operator. The detection unit detects whether or not there is any set value that has been changed from an initial value among one or more set values for one or more setting items. The controller performs control so as not to change the one or more set values for the one or more setting items to one or more set values registered for the operator authenticated by the authenticating unit in the case where the detection unit detects that there is any set value that has been changed from the initial value.

6 Claims, 13 Drawing Sheets

(51) Int. Cl.
*H04N 1/00* (2006.01)
*H04N 1/333* (2006.01)

(56) References Cited

U.S. PATENT DOCUMENTS

| | | | | |
|---|---|---|---|---|
| 2014/0047554 | A1* | 2/2014 | Kojima | G06F 21/62 |
| | | | | 726/27 |
| 2015/0172504 | A1* | 6/2015 | Sato | H04N 1/32026 |
| | | | | 358/1.13 |
| 2015/0261481 | A1* | 9/2015 | Takenaka | G06F 3/1285 |
| | | | | 358/1.15 |
| 2015/0373216 | A1* | 12/2015 | Maeda | H04N 1/4406 |
| | | | | 358/1.14 |
| 2016/0227057 | A1* | 8/2016 | Jarvis | H04N 1/00514 |
| 2017/0070625 | A1* | 3/2017 | Yee | H04N 1/00517 |
| 2017/0085730 | A1* | 3/2017 | Maeda | H04N 1/00482 |

FOREIGN PATENT DOCUMENTS

| | | |
|---|---|---|
| JP | 2009-303141 A | 12/2009 |
| JP | 2011-182038 A | 9/2011 |

\* cited by examiner

| USER IDENTIFICATION INFORMATION | SETTING ITEM | | | | | |
|---|---|---|---|---|---|---|
| USER NAME | COLOR MODE | PAPER SELECTION | MAGNIFICATION SELECTION | CONCENTRATION ADJUSTMENT | DOUBLE-SIDE/SINGLE-SIDE SELECTION | |
| USER A | FULL COLOR | A4 | AUTOMATIC | NOT APPLIED | SINGLE-SIDE → DOUBLE-SIDE | |
| USER B | BLACK AND WHITE | A4 | 100% | THICKER | SINGLE-SIDE → SINGLE-SIDE | |
| USER C | AUTOMATIC | AUTOMATIC | 100% | THINNER | SINGLE-SIDE → DOUBLE-SIDE | |
| USER D | BLACK AND WHITE | AUTOMATIC | AUTOMATIC | NOT APPLIED | SINGLE-SIDE → SINGLE-SIDE | |

USER AUTHENTICATION

ENTER ID AND PASSWORD FOR
USER AUTHENTICATION

ID:

PASSWORD:

OK   CANCEL

INFORMATION PROCESSING APPARATUS, IMAGE FORMING APPARATUS, INFORMATION PROCESSING METHOD, AND NON-TRANSITORY COMPUTER READABLE MEDIUM FOR MANAGING SETTING ITEMS

CROSS-REFERENCE TO RELATED APPLICATIONS

This application is based on and claims priority under 35 USC 119 from Japanese Patent Application No. 2016-163272 filed Aug. 24, 2016.

BACKGROUND

Technical Field

The present invention relates to an information processing apparatus, an image forming apparatus, an information processing method, and a non-transitory computer readable medium.

SUMMARY

According to an aspect of the present invention, there is provided an information processing apparatus including: an authenticating unit that authenticates an operator; a detection unit that detects whether or not there is any set value that has been changed from an initial value among one or more set values for one or more setting items; and a controller that performs control so as not to change the one or more set values for the one or more setting items to one or more set values registered for the operator authenticated by the authenticating unit in a case where the detection unit detects that there is any set value that has been changed from the initial value.

BRIEF DESCRIPTION OF THE DRAWINGS

An exemplary embodiment of the present invention will be described in detail based on the following figures, wherein.

DETAILED DESCRIPTION

Now, an exemplary embodiment of the present invention will be described in detail below with reference to the drawings.

Figure 1:
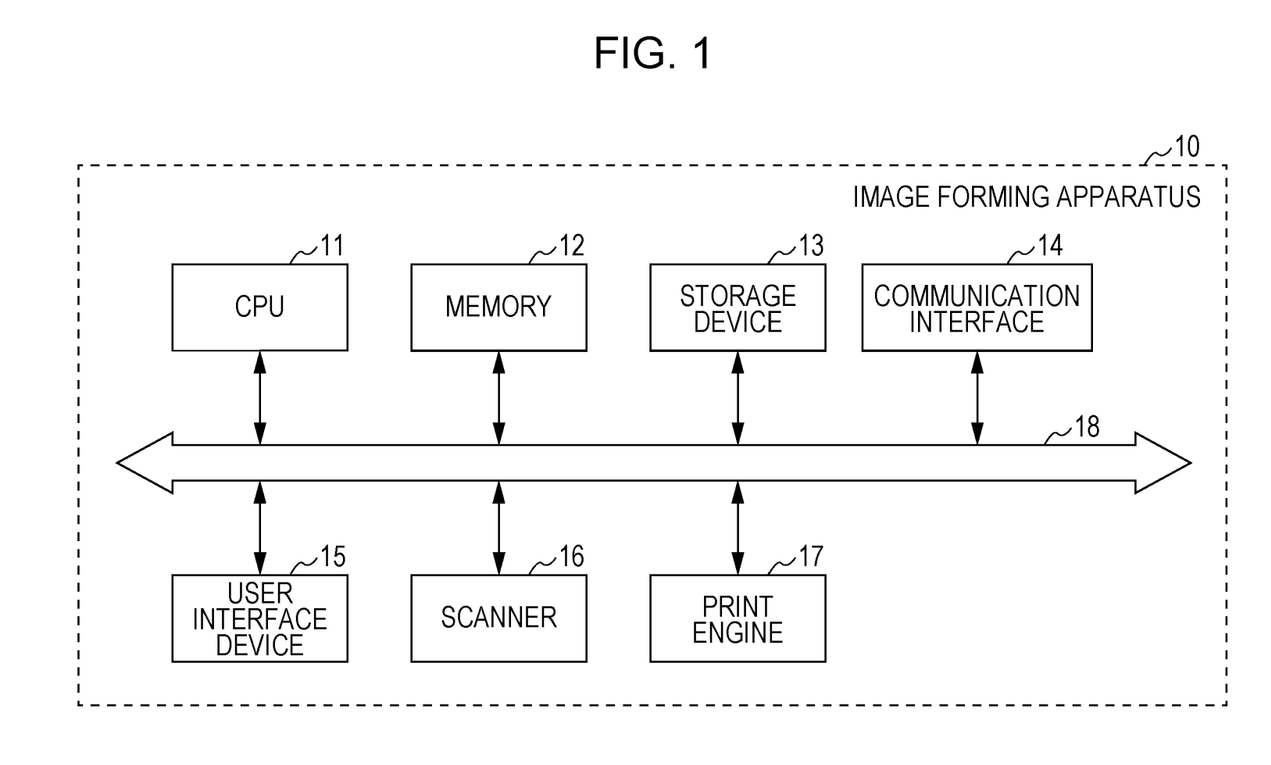
FIG. 1 is a block diagram illustrating the hardware configuration of an image forming apparatus according to an exemplary embodiment of the present invention.

FIG. 1 illustrates the hardware configuration of an image forming apparatus 10 which is an example of an information processing apparatus according to the exemplary embodiment.

As illustrated in FIG. 1, the image forming apparatus 10 includes a central processing unit (CPU) 11, a memory 12, a storage device 13 such as a hard disk drive (HDD), a communication interface 14 that transmits and receives data to and from an external device or the like via a network, a user interface device 15 that includes a touch panel or a liquid crystal display and a keyboard, a scanner 16, and a print engine 17. Such components are connected to each other via a control bus 18.

The print engine 17 prints an image on a recording medium such as printing paper through processes such as charging, exposure, development, transfer, and fixation.

The CPU 11 controls operation of the image forming apparatus 10 by executing a predetermined process on the basis of a control program stored in the memory 12 or the storage device 13. In the exemplary embodiment, the CPU 11 reads and executes a control program stored in the memory 12 or the storage device 13. However, such a program may be stored in a storage medium such as a CD-ROM to be provided to the CPU 11.

Figure 2:
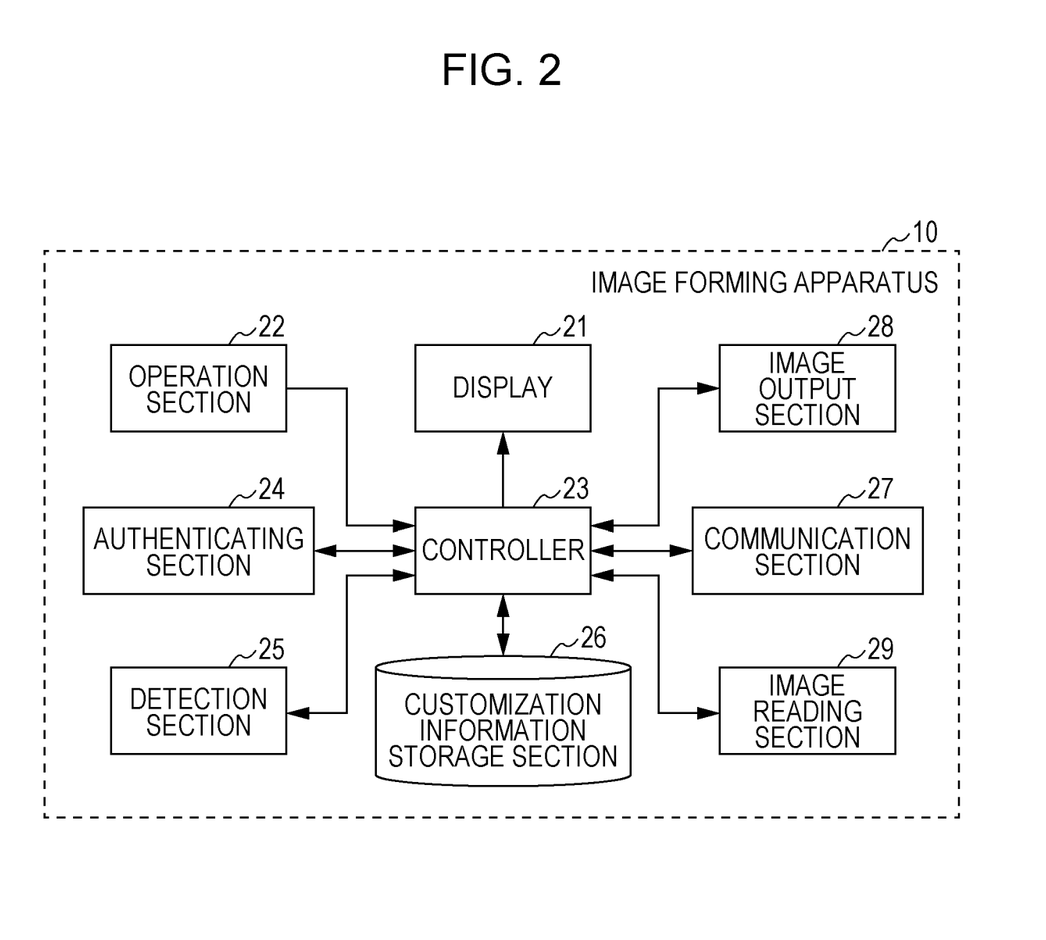
FIG. 2 is a block diagram illustrating the functional configuration of the image forming apparatus according to the exemplary embodiment of the present invention.
Figure 3:
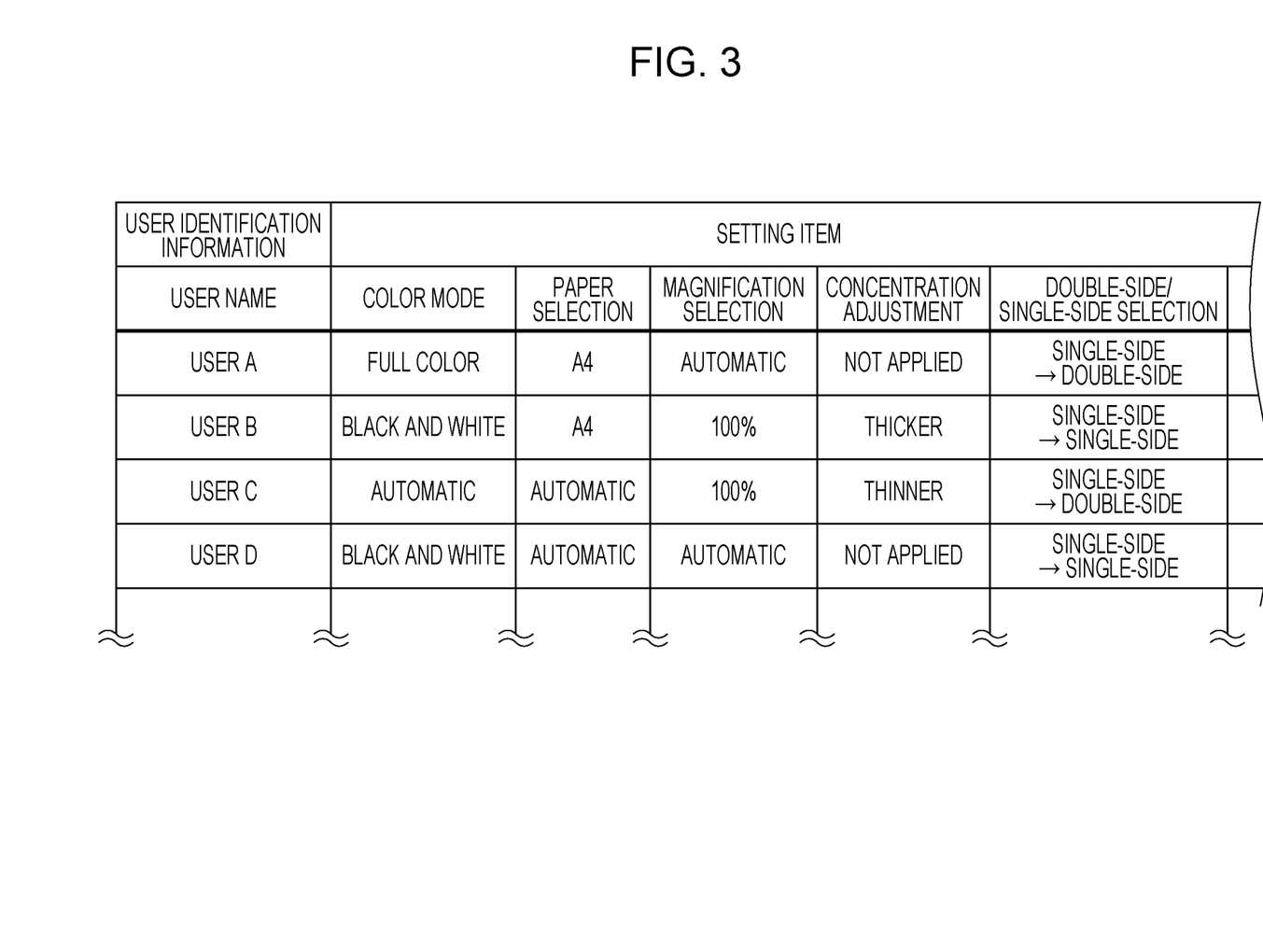
FIG. 3 illustrates an example of customization information stored in a customization information storage section.

FIG. 2 is a block diagram illustrating the functional configuration of the image forming apparatus 10 which is implemented by executing the control program described above. FIG. 3 illustrates an example of customization information stored in a customization information storage section 26.

As illustrated in FIG. 2, the image forming apparatus 10 according to the exemplary embodiment includes a display 21, an operation section 22, a controller 23, an authenticating section 24, a detection section 25, the customization information storage section 26, a communication section 27, an image output section 28, and an image reading section 29.

The image output section 28 executes a process of outputting an image onto a recording medium such as printing paper. The image reading section 29 executes a process of reading a document image by scanning a document.

The controller 23 performs various types of control, such as controlling operation of the image output section 28 and the image reading section 29 and displaying various types of information on the display 21, on the basis of operation information input using the operation section 22.

In FIG. 2, the display 21 and the operation section 22 are illustrated as separate components. In the exemplary embodiment, however, the display 21 and the operation section 22 are constituted as an integral component by a touch screen.

The authenticating section 24 authenticates a user that attempts to use the image forming apparatus 10 using an authentication method such as input of an ID and a password, or an IC card, for example.

The customization information storage section 26 stores, as customization information, one or more set values registered in advance by the user for one or more setting items related to one or more functions of the image forming apparatus 10. Specifically, as illustrated in FIG. 3, the customization information storage section 26 stores, as customization information, set values registered in advance by the user for setting items such as the color mode, paper selection, magnification selection, concentration adjustment, and double-side/single-side selection.

The detection section 25 detects whether or not there is any set value that has been changed from the initial value among the set values for the setting items related to the one or more functions.

Figure 4:
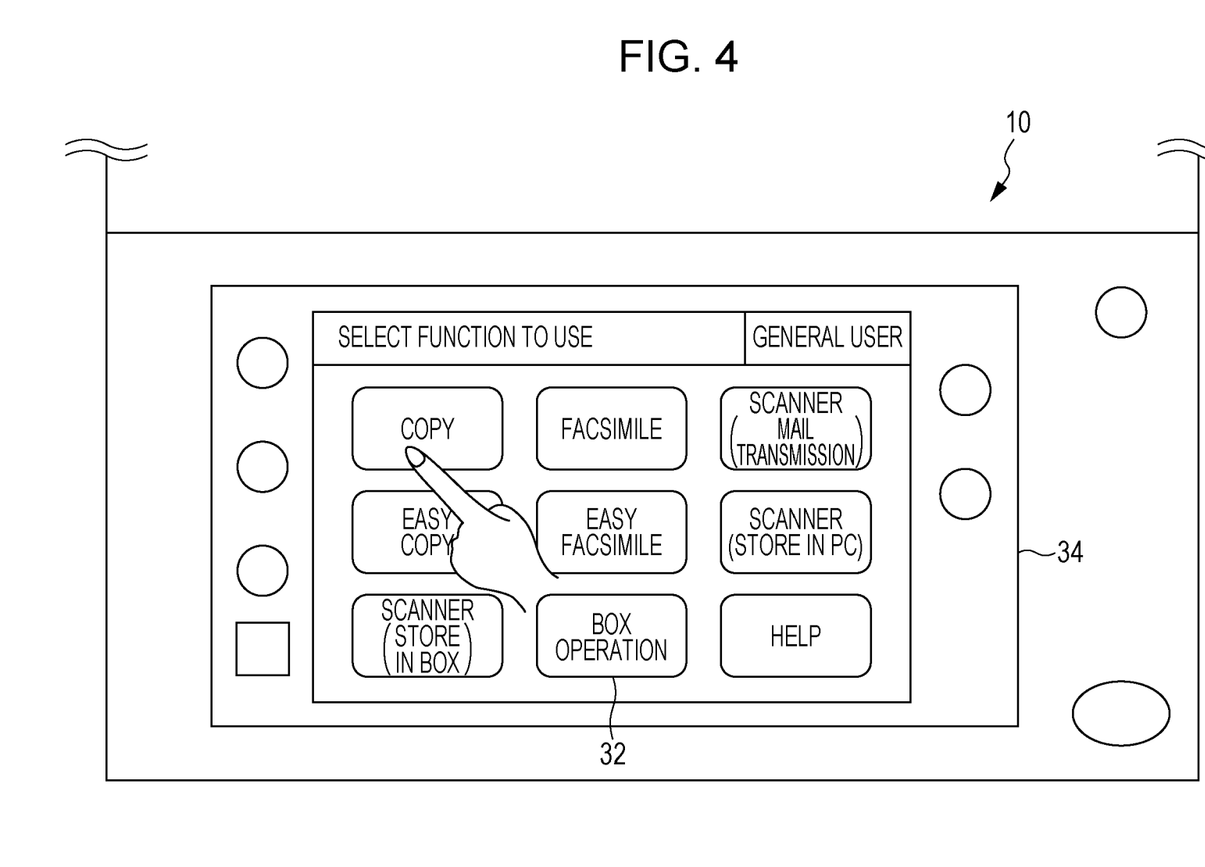
FIG. 4 illustrates an example of a menu screen displayed on an operation panel.

As illustrated in FIG. 4, the display 21 displays, on an operation panel 34, a menu screen that includes one or more icons 32 that are pictorial figures corresponding to the one or more functions on the basis of the control by the controller 23. When the icon 32 such as "copy", "facsimile", "scanner", . . . , "box operation", and "help" illustrated in FIG. 4 is operated by touching the icon 32 using an operating element such as a finger or a pen, the display 21 transitions to a screen for making a change to the setting of the various functions.

Figure 5:
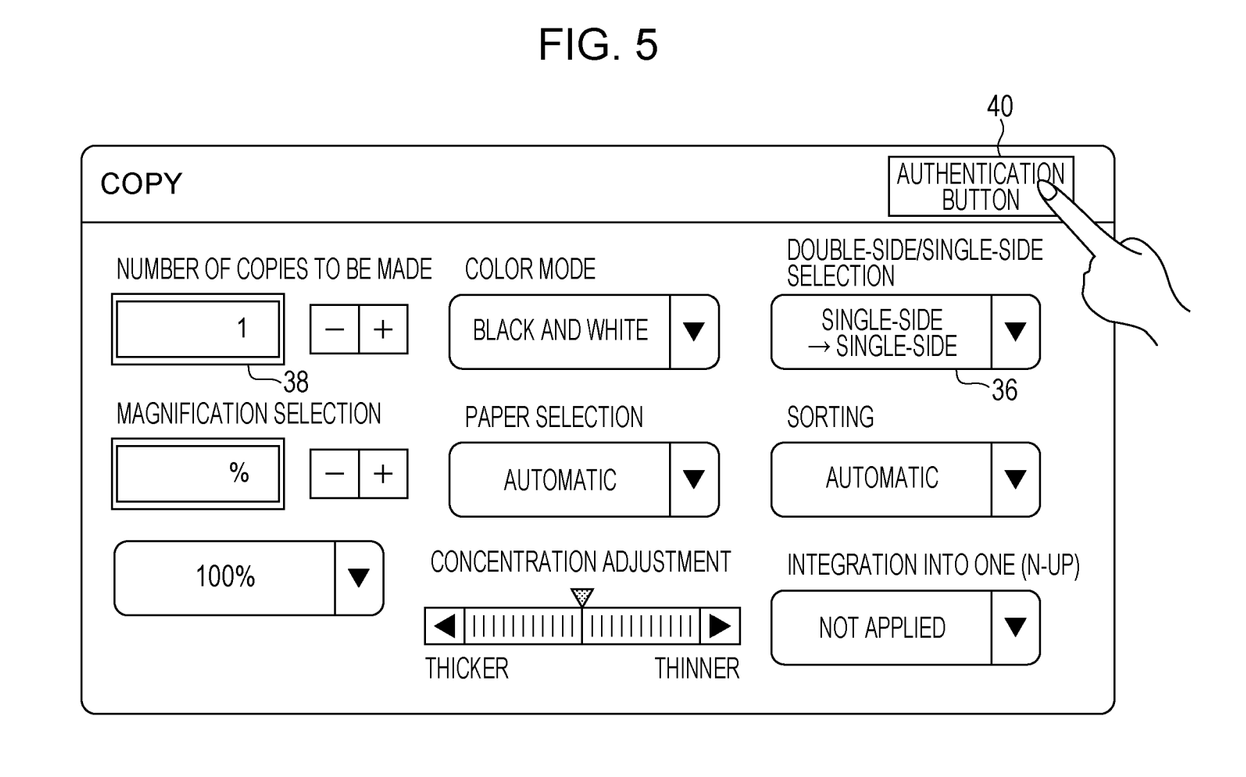
FIG. 5 illustrates an example of a copy screen (initial screen) displayed on the operation panel.

The display 21 displays a copy screen that includes one or more icons 36 for providing information related to the one or more functions related to copying, such as a copy screen illustrated in FIG. 5, in the case where the "copy" icon 32 is selected on the menu screen.

The "icons" are pictorial figures displayed on a display screen for starting a specific application program or indicating an operation position for transitioning to a specific screen. The pictorial figures include not only designed figures but also various types of characters such as alphabets and hiragana, katakana, and kanji characters.

On the copy screen illustrated in FIG. 5, a numeral is input to a double rectangular box 38 corresponding to "number of copies to be made" or "magnification selection", for example, and the right portion of each of the one or more icons 36 is touched using the operating element to select an operation for a setting item related to the corresponding function. Then, an authentication screen such as an authentication screen illustrated in FIG. 6, for example, is displayed when an authentication button 40 displayed on the copy screen is touched.

Figure 6:
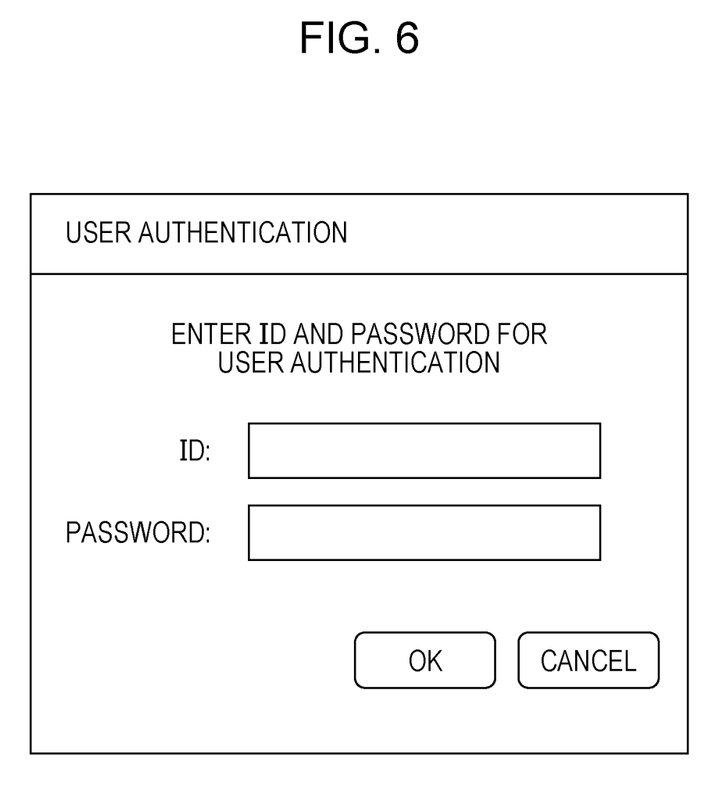
FIG. 6 illustrates an example of an authentication screen displayed on the operation panel.
Figure 7:
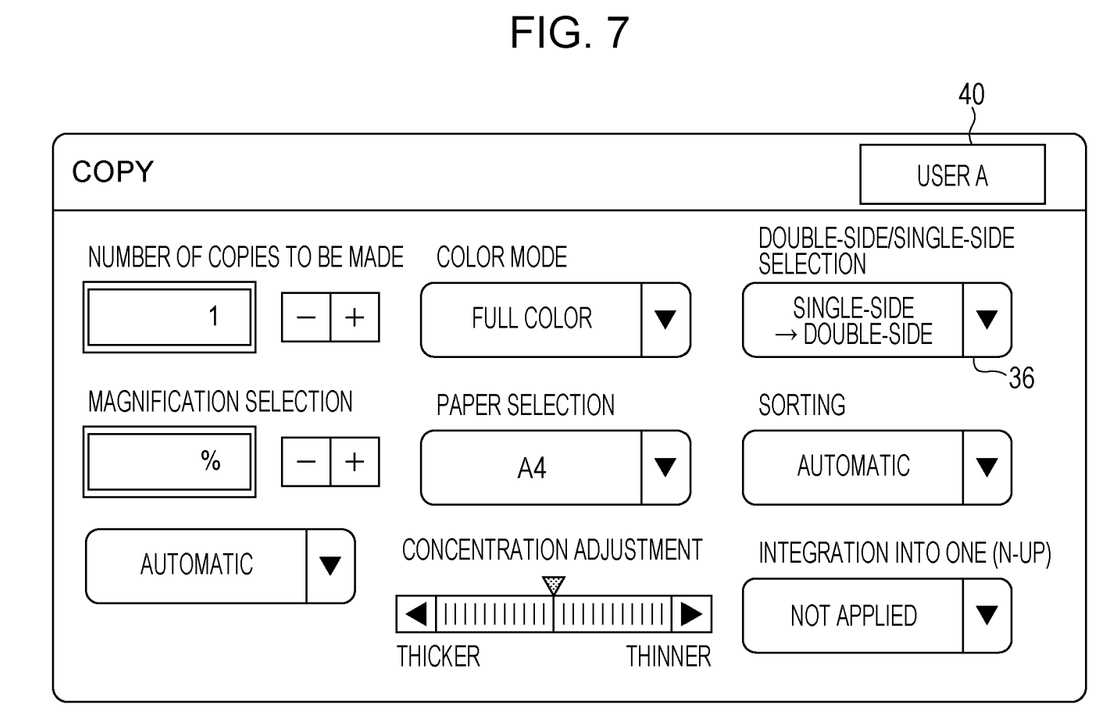
FIG. 7 illustrates an example of the copy screen displayed on the operation panel.
Figure 10:
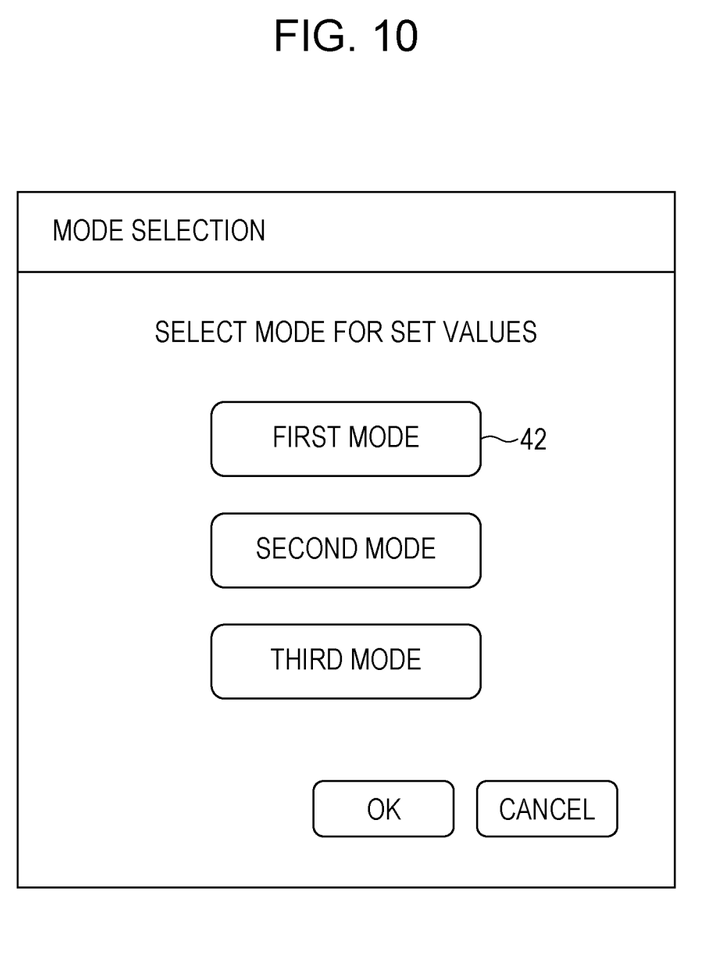
FIG. 10 illustrates an example of a mode selection screen displayed on the operation panel.

A message that prompts the user to input an ID and a password is displayed on the authentication screen. When an ID and a password are input and the authenticating section 24 performs an authentication process, the detection section 25 detects whether or not there is any set value that has been changed from the initial value among the set values for the setting items. As discussed in detail later, in the case where the detection section 25 detects that there is any set value that has been changed from the initial value, a mode selection screen of FIG. 10 is displayed. In the case where the detection section 25 detects that there is no set value that has been changed from the initial value, meanwhile, the set values for the setting items are changed from the initial values to the set values which have been stored in the customization information storage section 26 and registered in advance by the authenticated user, and the setting items are displayed on the copy screen which is authenticated by the user. Specifically, as illustrated in FIG. 7, the set values for the setting items are changed to the set values which have been registered in advance by a user A that has been authenticated, and the setting items are displayed with "color mode" changed to "full color", "paper selection" changed to "A4", "magnification selection" changed to "automatic", and "double-side/single-side selection" changed to "single side→double side" from the initial values.

In the case where the user has not been authenticated through an authentication process as described above, the controller 23 controls the display 21 so as to display set values saved as the initial values. In the case where the user has been authenticated through an authentication process, the controller 23 controls the display 21 so as to display set values registered in advance by the authenticated user.

Figure 8:
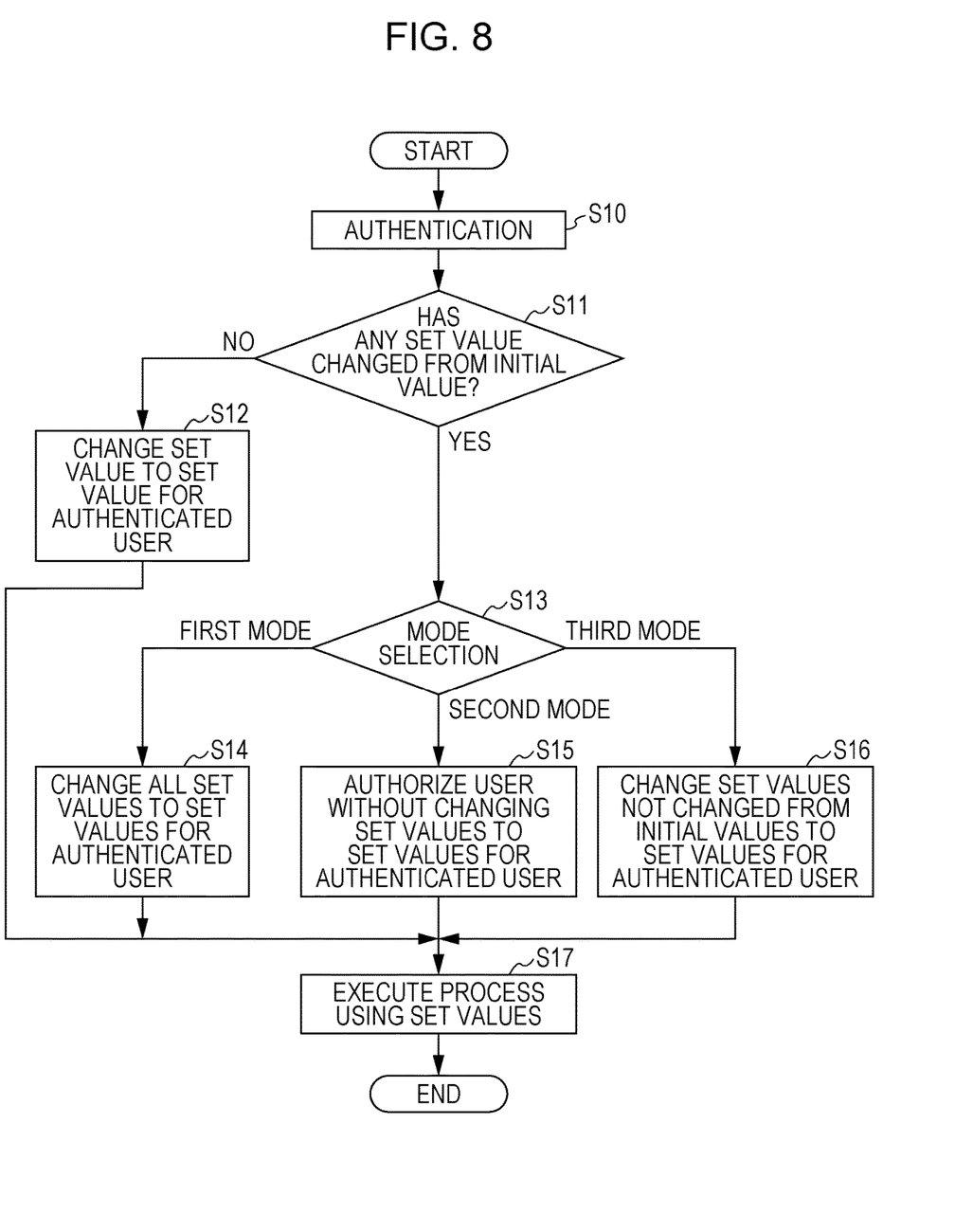
FIG. 8 is a flowchart illustrating operation of the image forming apparatus according to the exemplary embodiment of the present invention.
Figure 9:
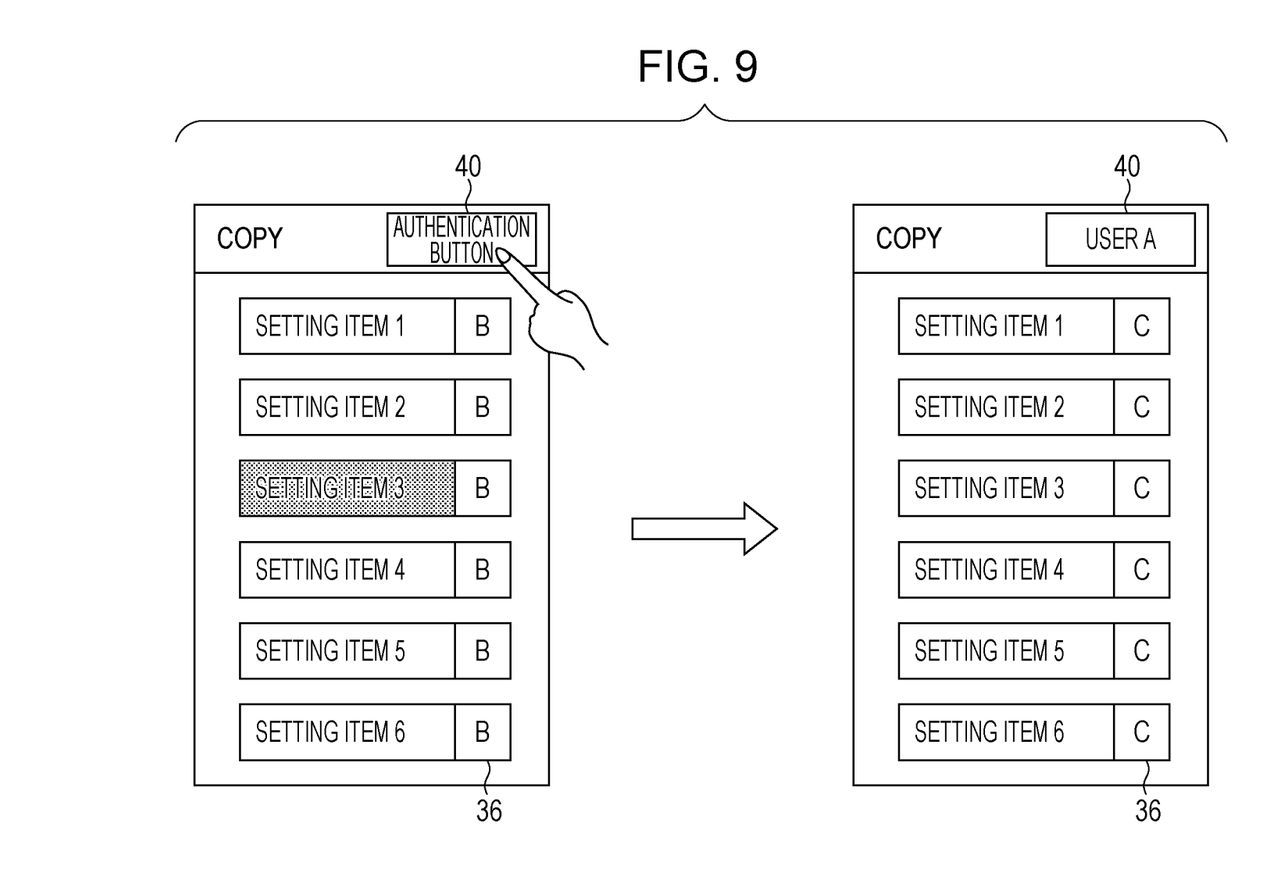
FIG. 9 illustrates operation of the image forming apparatus according to the exemplary embodiment of the present invention.
Figure 11:
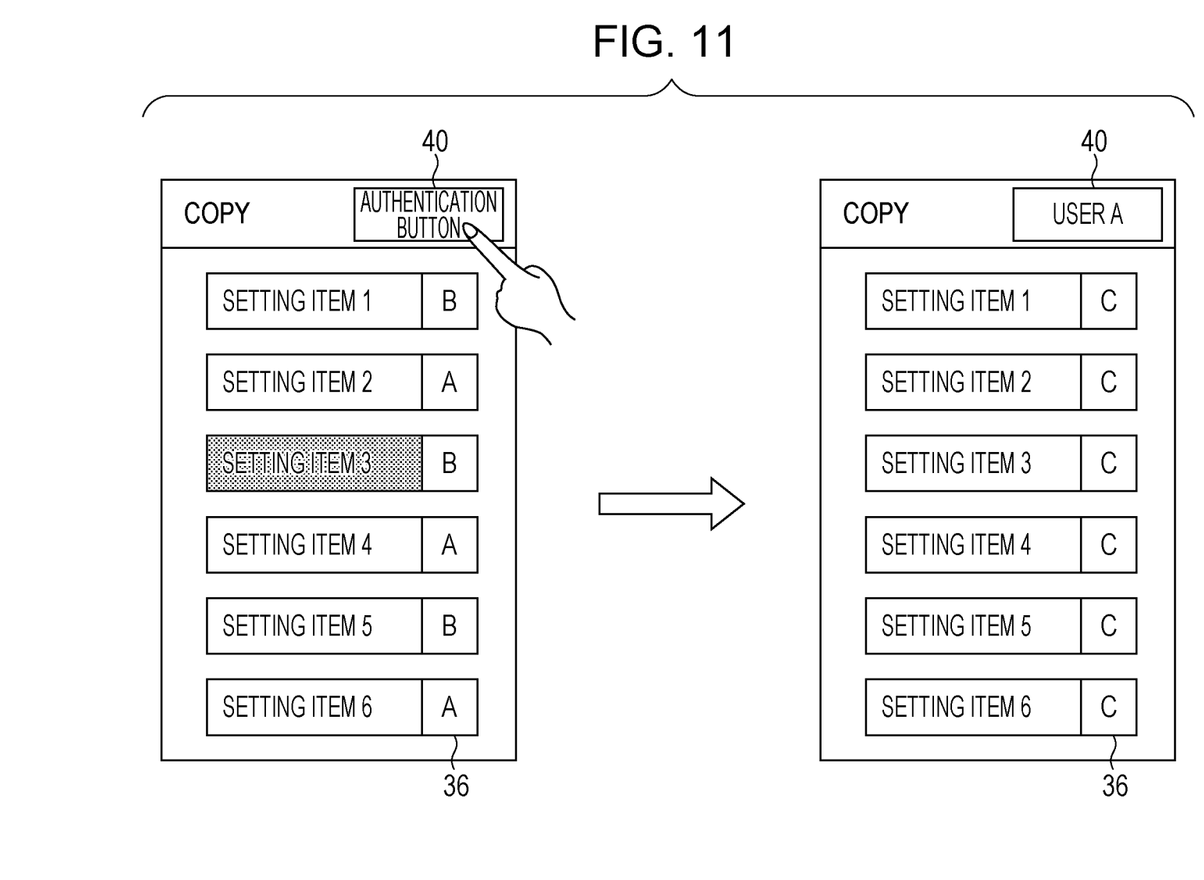
FIG. 11 illustrates operation of the image forming apparatus with mode selection (first mode)
Figure 12:
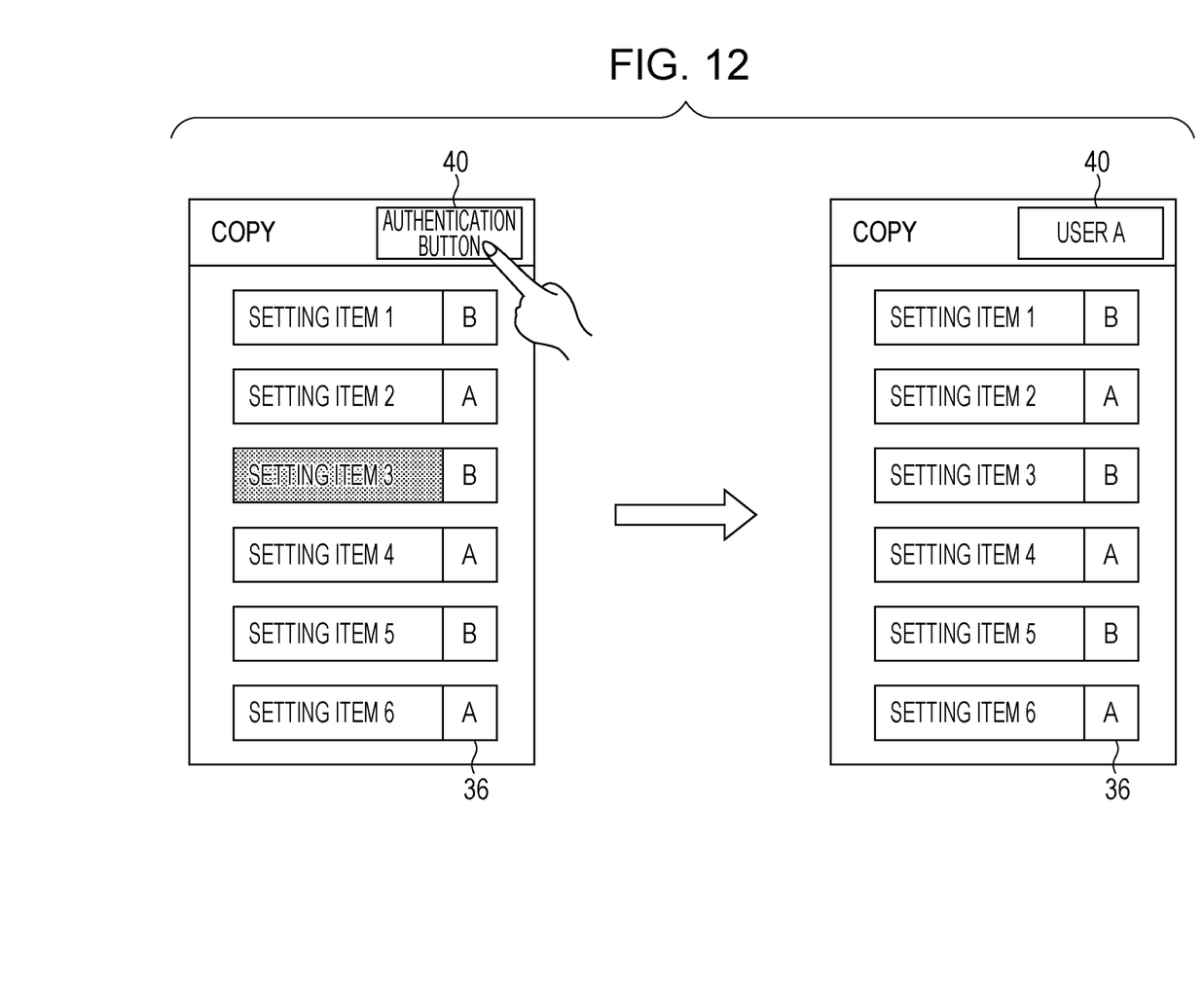
FIG. 12 illustrates operation of the image forming apparatus with mode selection (second mode)
Figure 13:
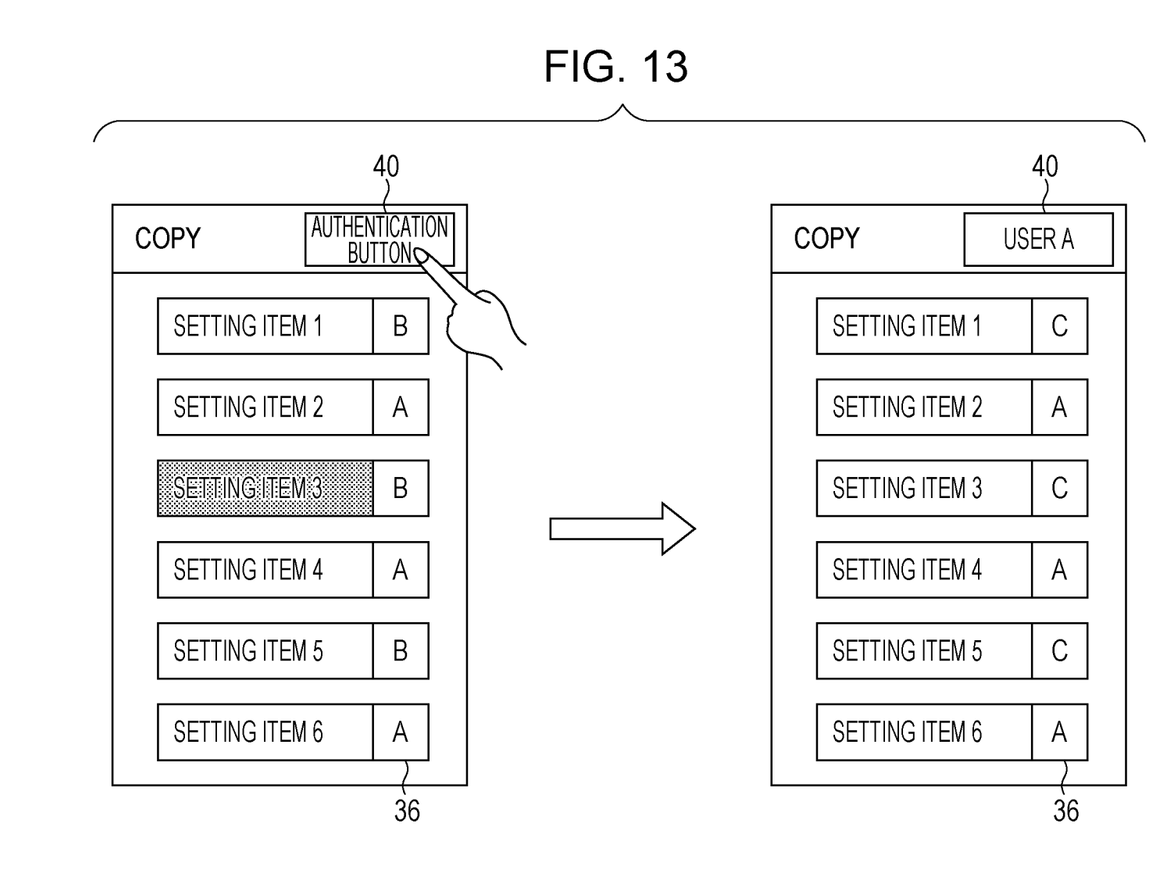
FIG. 13 illustrates operation of the image forming apparatus with mode selection (third mode).

Next, operation of the image forming apparatus 10 according to the exemplary embodiment of the present invention will be described with reference to FIGS. 8 to 13. FIG. 8 is a flowchart illustrating operation of the image forming apparatus 10. FIG. 9 illustrates operation of the image forming apparatus 10 for a case where an authentication process is performed in a state with the initial values. FIG. 10 illustrates the mode selection screen. FIG. 11 illustrates operation of the image forming apparatus 10 for a case where a first mode is selected on the mode selection screen. FIG. 12 illustrates operation of the image forming apparatus 10 for a case where a second mode is selected on the mode selection screen. FIG. 13 illustrates operation of the image forming apparatus 10 for a case where a third mode is selected on the mode selection screen.

Setting items 1 to 6 are setting items related to the functions of the image forming apparatus 10 such as "color mode", "paper selection", "magnification selection", "concentration adjustment", and "double-side/single-side selection". Set values A, B, and C may be set for the setting items 1 to 6. The initial values for the setting items on an initial screen before authentication are all determined as "B". The set values for the setting items which are stored in the customization information storage section 26 as the customization information on the user A are all determined as "C". Among the setting items, an item that is grayed out is a setting item, the set value for which is changeable only when the user is authenticated. In the exemplary embodiment, the setting item 3 is an item, the set value for which is changeable only when the user is authenticated.

First, in step S10, when the authentication button 40 is touched on the copy screen, a user authentication screen illustrated in FIG. 6 is displayed. When an ID and a password are input, the authenticating section 24 performs an authentication process.

Next, in step S11, the detection section 25 detects whether or not there is any set value that has been changed from the initial value among the set values for the setting items. In the case where the detection section 25 detects that there is no set value that has been changed from the initial value, that is, in the case where the detection section 25 detects that all the set values remain the initial values, the process proceeds to step S12. In the case where the detection section 25 detects that there is any set value that has been changed from the initial value, that is, in the case where at least one of the set values has been changed from the initial value, the process proceeds to step S13.

Next, in step S12, the set values which are the initial values are changed to the set values (customization information) corresponding to the authenticated user to be displayed. Specifically, when the authentication button 40 is touched on the initial screen as illustrated in FIG. 9 and the authenticating section 24 performs an authentication process, a change is made for the setting items 1 to 6 from "B" which is the initial value to "C" which is the set value for the user A who has been authenticated, and the setting items are displayed. In addition, the icon 36 for the setting item 3 is displayed in white as with the other setting items, rather than the grayed-out state, so that the set value is changeable.

Next, in step S13, a mode selection screen such as a mode selection screen illustrated in FIG. 10 is displayed.

The mode selection screen includes icons 42 for a "first mode", a "second mode", and a "third mode, and allows the user to select one of the icons 42. In the "first mode", all the set values for one or more setting items are changed to the set values registered for the authenticated user. In the "second mode", the authenticated user is authorized to change a set value for a setting item, the set value for which is changeable only when the user is authenticated. In the "third mode", one or more set values which have not been changed from the initial values are changed to one or more set values registered for the authenticated user, and one or more set values which have been changed from the initial values are not changed to one or more set values registered for the authenticated user. In the case where the user selects the "first mode", the process proceeds to step S14. In the case where the user selects the "second mode", the process proceeds to step S15. In the case where the user selects the "third mode", the process proceeds to step S16.

In step S14, as a result of selecting the icon 42 for the "first mode", all the set values for the setting items, including the set values which have been changed from the initial values, are displayed as changed to the set values (customization information) corresponding to the authenticated user. Specifically, as illustrated in FIG. 11, even if the user is authenticated after the set values for the setting items 2, 4, and 6 are changed from "B" which is the initial value to "A", the set values for all the setting items are displayed as changed to "C" which is the set value for the user A who has been authenticated as a result of selecting the first mode. In addition, the icon 36 for the setting item 3 is displayed in white as with the other setting items, rather than the grayed-out state, so that the set value is changeable.

In step S15, as a result of selecting the icon 42 for the "second mode", the set values which have been changed from the initial values are maintained, and the authenticated user is authorized to change a set value for a setting item, the set value for which is changeable only when the user is authenticated. Specifically, as illustrated in FIG. 12, even if the user is authenticated after the set values for the setting items 2, 4, and 6 are changed from "B" which is the initial value to "A", the set values which have been changed from the initial values are maintained and the set value for the setting item, the set value for which is changeable only when the user is authenticated, becomes changeable as a result of selecting the second mode. Specifically, the setting item 3 is changed from a state in which the set value for the setting item 3 is not changeable to a state in which the set value for the setting item 3 is changeable, and the icon 36 for the setting item 3 is displayed in white as with the other setting items, rather than the grayed-out state.

In step S16, as a result of selecting the icon 42 for the "third mode", the set values which have not been changed from the initial values are changed to the set values registered for the authenticated user, and the set values which have been changed from the initial values are not changed to the set values registered for the authenticated user. Specifically, as illustrated in FIG. 13, even if the user is authenticated after the set values for the setting items 2, 4, and 6 are changed from "B" which is the initial value to "A", the set values "B" for the setting items 1, 3, and 5 which have not been changed from the initial values are changed to "C" which is the set value registered for the authenticated user A and the set values "A" for the setting items 2, 4, and 6 which have been changed from the initial values are maintained as a result of selecting the third mode. In addition, the icon 36 for the setting item 3 is displayed in white as with the other setting items, rather than the grayed-out state, so that the set value is changeable.

In step S17, the process is executed using the changed or unchanged set values.

In the exemplary embodiment described above, the user is authenticated using an authentication method such as input of an ID and a password. However, the present invention is not limited thereto, and the user may be authenticated using an authentication method in which an IC card is used or the like.

In the exemplary embodiment described above, mode selection is performed after the user is authenticated. However, the present invention is not limited thereto, and authentication and mode selection may be performed at the same time by allowing mode selection to be performed on the authentication screen.

In the exemplary embodiment described above, mode selection is performed in the case where there is any set value that has been changed from the initial value. However, the present invention is not limited thereto, and mode selection may be performed in advance so that the process is executed in the selected mode.

MODIFICATION

In the exemplary embodiment described above, the present invention is applied to an image forming apparatus. However, the present invention is not limited thereto. The present invention may also be applied to other information processing apparatuses such as a smartphone, a personal computer, and a tablet terminal apparatus alike.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      authenticate an operator;
      detect, for one or more setting items, if there is any set value that has been changed from an initial value;
      if one or more of the set values have been changed from the initial value to another value before the time the operator is authenticated, allow selection of one of a first mode, a second mode, and a third mode; and
      cause to be executed at least one of a process for scanning a document and outputting an image onto a recording medium using the one or more set values,
   wherein:
      in the first mode, all of the one or more set values for the one or more setting items are changed to one or more set values registered for the authenticated operator,
      in the second mode, the one or more set values that have been changed are maintained and the authenticated operator is authorized to change a set value for one of the setting items, which is not changeable when the operator is not authenticated but is changeable when the operator is authenticated, and in the third mode, one or more set values for the one or more setting items that have not been changed from their initial values are changed to one or more set values registered for the authenticated operator and the set values detected as changed are not changed to one or more set values registered for the authenticated operator.

2. The information processing apparatus according to claim 1, wherein the one or more setting items control one or more functions related to the at least one executed process.

3. The information processing apparatus according to claim 2, wherein the one or more setting items are one or more of color mode, paper selection, magnification selection, concentration adjustment, and double-side/single-side selection.

4. The information processing apparatus according to claim 1, wherein if none of the set values have been changed from the initial value at the time the operator is authenticated, the processor further performs control so as to change all of the set values to the set values registered for the authenticated operator.

5. The information processing apparatus according to claim 1, wherein if one or more of the set values have been changed to the set values registered for the authenticated operator as a result of execution of the first, second, or third mode, the changed one or more set values are marked.

6. The information processing apparatus according to claim 1, wherein the processor is configured to allow selection of different ones of the first, second, and third modes for (i) at least one of the one or more setting items whose set value has been changed before the time the operator is authenticated and (ii) at least one of the one or more setting items whose set value has been changed after the time the operator is authenticated.

* * * * *